Jan. 16, 1962 M. J. FINK ET AL 3,017,631

SELECTIVE PAGING RECEIVER

Filed March 24, 1958 2 Sheets-Sheet 1

INVENTORS
Marvin J. Fink &
BY Christopher J. Birk
E. W. Christen
ATTORNEY

INVENTORS
Marvin J. Fink &
BY Christopher J. Birk
E. W. Christen
ATTORNEY

United States Patent Office 3,017,631
Patented Jan. 16, 1962

3,017,631
SELECTIVE PAGING RECEIVER
Marvin J. Fink, Flint, and Christopher J. Birk, Clio, Mich., assignors to General Motors Corporation, Detroit, Mich., a corporation of Delaware
Filed Mar. 24, 1958, Ser. No. 723,550
5 Claims. (Cl. 343—225)

This invention relates to selective signaling systems and more particularly to paging system receivers which may be carried on the person.

Paging systems using space transmitted call signals have attained widespread use for calling a selected person to signify that he is to make contact, as by telephone or otherwise, with a designated base station for further communication. Such systems are commonly used in industrial organizations or the like wherein personnel who must be immediately available are provided with a portable receiver.

It is a common practice to utilize in such paging systems a receiver having a signaling device which arrests the attention of the person by producing an audible or visible signal. However, such signaling devices are unsatisfactory in environments of high noise level such as in factories where an audible signal would not be noticed or in environments of low noise level such as hospitals where the audible signal would be objectionable. In accordance with this invention there is provided a paging receiver having a signaling device which is usable under any environmental conditions by producing a sensible vibration to signify to the person that he is being paged. This is accomplished by the use of a movable mass which is subjected to continuous acceleration by a driving motor which is energized upon the occurrence of the call signal assigned to the particular receiver.

In the operation of such paging systems, an important factor of cost is the replacement of batteries in the individual receivers. In order that the drain on the batteries may be minimized, the inventive receiver is provided with an attitude responsive switch which deenergizes the receiver circuits when the receiver is removed from the person's pocket.

Other features of the selective paging receiver include improved circuitry which provides high sensitivity and high power output and which admits of compact and lightweight design. To adapt the receiver for a system having a large number of channels, it is provided with a tuned reed decoder relay which permits the available code elements to be arranged in permutation for encoding a call signal.

A more complete understanding of this invention may be had from the detailed description which follows taken with the accompanying drawings in which.

Figure 1:
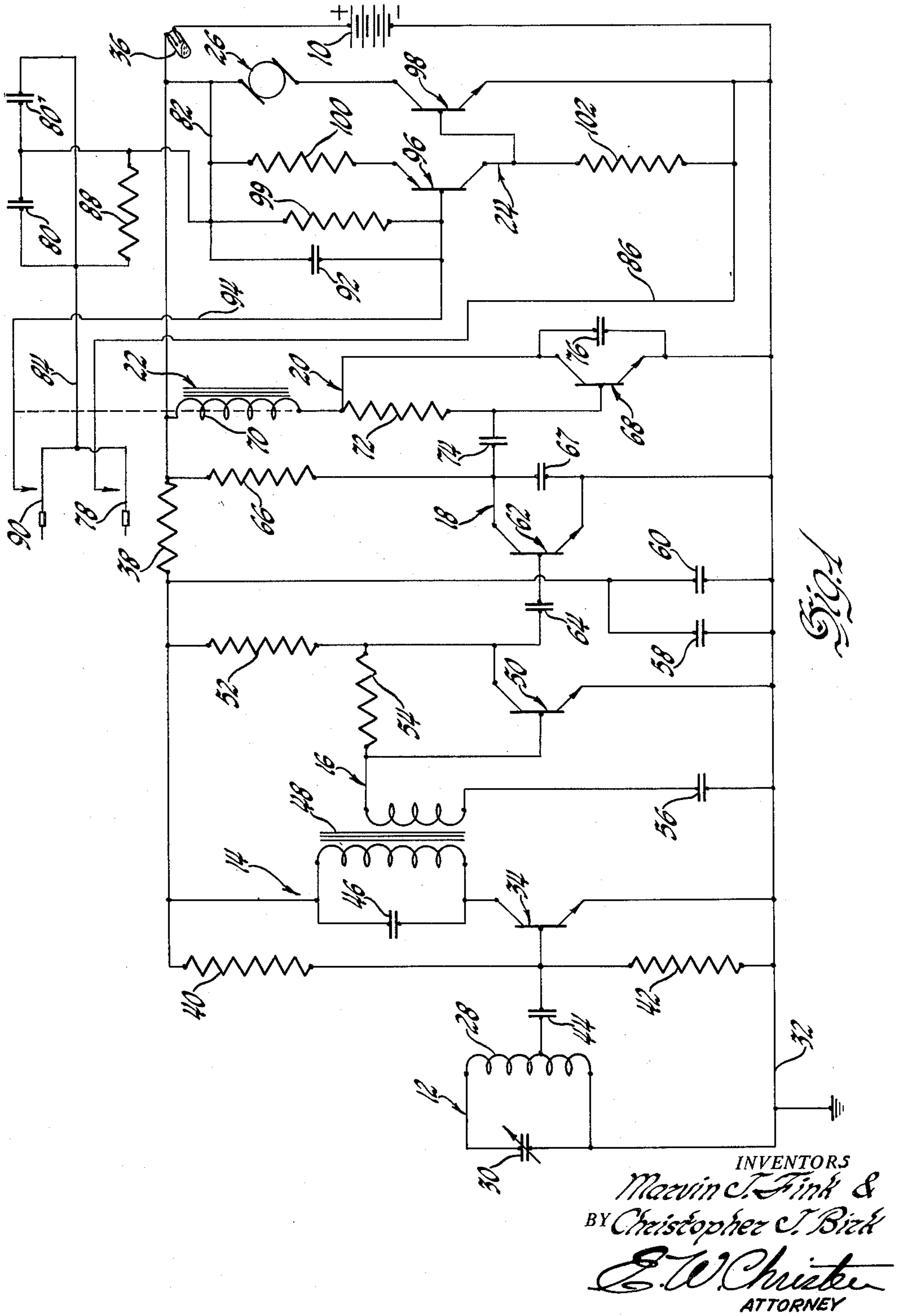
FIGURE 1 is a schematic diagram of the receiver circuit.
Figure 2:
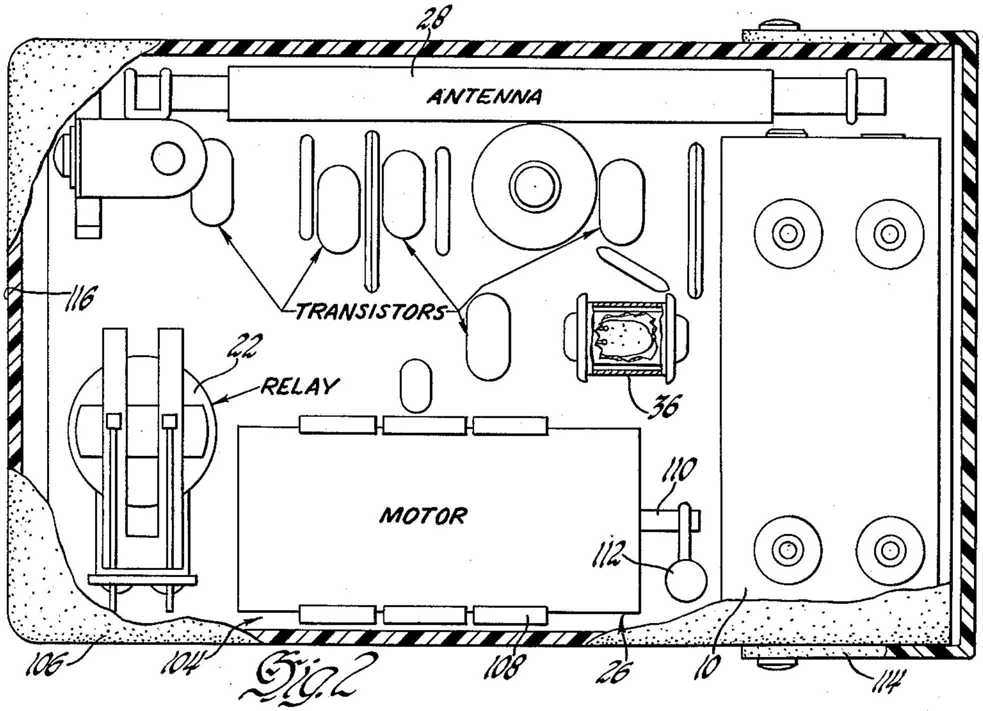
FIGURE 2 is a front view of the receiver assembly with part of the casing removed to reveal selected parts.
Figure 3:
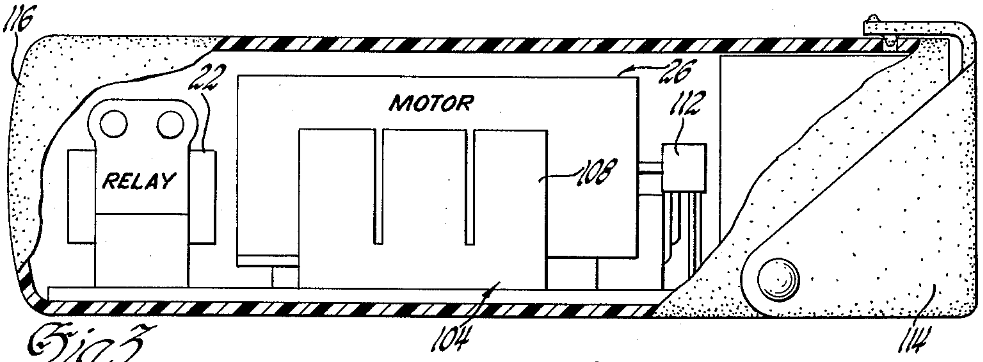
FIGURE 3 is a side view of the receiver assembly with part of the casing removed.

Referring now to the drawings, there is shown an illustrative embodiment of the invention in a selective paging receiver for use in a system of the type wherein call signals are encoded by the sequential modulation of a carrier wave by plural tone frequencies. In such systems the total number of different call signals depends upon the number of permutations of the different tone frequencies when a given number is used in each call signal. More specifically, the total number of call signals is given by the expression $$M=n(n-1)(n-2)\ldots(n-p+1)$$

where $n$=number of tone frequencies
$p$=the number of tone frequencies taken at a time.

In a typical example, the system may utilize a radio frequency carrier wave of 60 kilocycles per second which may be modulated with tone frequencies ranging from 190 cycles to 600 cycles and spaced at intervals of 20 cycles. Using two tone frequencies at a time, the total number of call signals, and hence the number of receivers which may be served by the system, is 380.

In the illustrative embodiment of the invention, each receiver is adapted to respond only to the receipt of its assigned call signal to produce sensible vibrations of the receiver to apprise the person that he is being paged. In general, the receiver comprises a low voltage source of direct current such as a battery 10 for energizing the receiver circuits and an antenna 12 for coupling the carrier wave signal to the receiver circuits. The signal voltage developed by the antenna is applied to first and second radio frequency amplifiers 14 and 16 whereby the radio frequency energy is amplified and thence to the detector 18 for demodulation of the tone frequencies. The tone frequency signal voltages developed by the detector are amplified by the tone amplifier 20 which energizes a decoder such as a reed relay 22 which accepts only the tone frequencies and sequence thereof assigned to the particular receiver. The reed relay develops a control voltage which is applied to a switching network 24 which in turn controls the energization of the motor 26 of a vibratory signaling device.

The antenna 12 comprises an inductance coil 28 provided with a ferrite core and connected in parallel with a tuning condenser 30 for resonating the antenna to the carrier wave frequency. One terminal of the condenser 30 is connected to a point of reference potential or ground 32. The carrier wave signal voltage is derived from the antenna between ground and an intermediate tap on coil 28 for application to the radio frequency amplifier 14.

The radio frequency amplifier 14 comprises a transistor 34 of the NPN type connected in a common emitter configuration. Bias voltages for the transistor 34 are supplied from the battery 10 through the switch 36 and the current limiting resistor 38. The input circuit extending between base and emitter electrodes of the transistor 34 is biased in the forward direction through the voltage divider resistor 40 and includes a bias resistor 42. Impedance matching between the antenna 12 and the input circuit of the transistor 34 is obtained by the selected position of the tap on the inductance coil 28 for applying the signal voltage through the coupling condenser 44. The output circuit of the amplifier 14 extends between collector and emitter electrodes and is biased in the reverse direction by the battery 10. The collector circuit is tuned to the frenquency of the carrier wave by the parallel resonant oircuit including condenser 46 connected across the primary winding of the coupling transformer 48 which develops the output voltage of amplifier 14.

This output voltage from the amplifier 14 is applied to the input circuit of the second radio frequency amplifier 16 which comprises a transistor 50 of the NPN type connected in grounded emitter configuration. The input circuit extending between emitter and base electrodes is biased in the forward direction through the current limiting resistor 38 and the voltage dividing resistors 52 and 54. The signal voltage is applied to the input circuit by the secondary winding of the transformer 48 and the condenser 56. The amplified carrier wave voltage developed by amplifier 16 is derived from the collector electrode of the transistor 50 for application to the succeeding detector stage 18. The radio frequency amplifiers 14 and 16 are decoupled from the remainder of the receiver circuits by the filter section comprising the current limiting resistor 38 and the shunt condensers 58 and 60.

The detector 18 comprises a transistor 62 of the NPN type which provides for demodulation of the carrier wave together with power amplification of the demodulation signal voltage. The input circuit of the detector extends between the emitter and base electrodes and is operated with a base current of zero direct current value. The signal voltage from the amplifier 16 is applied to the base electrode through the coupling condenser 64. The output circuit extending between the emitter and collector electrodes is biased in the reverse direction by the battery 10 through the resistor 66. The input circuit current flows only during the positive half cycles of the input signal and the condenser 64 is of such value that it discharges during the negative half cycles. Accordingly, the output circuit current flows only during positive half cycles and a condenser 67 is connected across the collector and emitter electrodes of transistor 52 to bypass the radio frequency component thereof. Accordingly, the demodulation signal voltage is developed at the collector electrode of the transistor 62.

The demodulation signal voltage developed by the detector 18 represents the encoded call signal by the succession of two different tone frequencies. This demodulation signal voltage is applied to the tone amplifier 20 which comprises a transistor 68 of the NPN type connected in grounded emitter configuration. The input circuit extending between base and emitter electrodes is biased in the forward direction by the battery 10 through the energizing coil 70 of the reed relay 22 and the voltage dividing resistor 72. The demodulation signal voltage from detector 18 is applied to this input circuit through the coupling condenser 74. The output circuit of the tone amplifier 20 extending between collector and emitter electrodes is biased in the reverse direction from the battery 10 and includes the energizing coil 70 of the reed relay 22. A condenser 76 is connected across the collector and emitter electrodes of the transistor 68 and, effectively at the tone frequency, is connected across the terminals of the energizing coil 70 through the battery 10. The value of condenser 76 is such that it forms with the energizing coil 70 a parallel resonant circuit which is broadly tuned to the tone frequencies.

The tone amplifier 20 thus energizes the reed relay coil 70 with successive tone frequencies corresponding to the transmitted call signal. The reed relay 22 has a first reed contact 78 which is mechanically resonant at the first tone frequency of the call signal assigned to this particular receiver. This reed contact 78 is connected in a charging circuit for condensers 80 and 80′ which extends from one terminal of the battery 10 through the switch 36, conductor 82 to one terminal of the condensers 80 and 80′ and thence from the other terminals through conductor 84 and the reed contact 78 and conductor 86 to the other terminal of the battery. A leak resistor 88 is connected in parallel with condensers 80 and 80′ to form a discharge circuit of relatively long time constant. The reed relay 22 also includes a second reed contact 90 which is mechanically resonant at the second tone frequency of the call signal assigned to this particular receiver. The reed contact 90 is connected in a charge transfer circuit for applying the voltage across condensers 80 and 80′ to a condenser 92 in the input circuit of the switching network 24. This charge transfer circuit extends from one terminal of the condensers 80 and 80′ through conductor 84, reed contact 90 and conductor 94, and through condenser 92 to the other terminal of condensers 80 and 80′. Thus, a control voltage is developed by the reed relay 22 upon the occurrence of the call signal assigned to this particular receiver and this control voltage is applied to the input circuit of the switching network 24.

The switching network 24 comprises a transistor 96 of the PNP type connected in cascade with a transistor 98 of the NPN type. The transistor 96 has an input circuit, extending between base and emitter electrodes, which includes a resistor 99 in parallel with the condenser 92 and which includes a series emitter resistor 100. The transistor 96, in the absence of a control voltage across the input circuit, is operated at collector current cut-off. The output circuit of transistor 96 extending between emitter and collector electrodes is biased in the reverse direction by the battery 10 and includes the emitter resistor 100 and a collector resistor 102. An amplified control voltage is developed across the resistor 102 upon the occurrence of a control voltage across the input circuit and is applied to the input circuit of the transistor 98 which is operated as a switch, i.e. either fully conductive or non-conductive. The transistor 98 has its input circuit, extending between base and emitter electrodes, connected across the resistor 102 and in the absence of a control voltage is operated at collector current cut-off. The output circuit of the transistor 98, extending between collector and emitter electrodes, is biased in the reverse direction from the battery 10 and includes the energizing windings of the motor 26 of the signaling device. Upon the occurrence of a control voltage, the motor 26 is energized and, in a manner to be described presently, produces sensible vibrations.

The enirte receiver, including the motor 26, is supported upon a chassis 104 which is removably mounted within a pocket-size casing 106. The motor 26 is secured to the chassis by a bracket 108 and has a rotor shaft 110 to which is affixed a weight 112 which is disposed to produce an eccentric mass center of the rotor assembly. The weight 112 is provided an unobstructed path of motion so that energy is abstracted from the moving mass only through the shaft 110 and thence to chassis 104 and casing 106. The motor 26 is a conventional miniature direct current motor, suitably having a permanent magnet field, and its speed is so related to the mass and radius arm of the weight 112 that the resultant centrifugal force produces a vibratory motion of the casing which is readily sensed by the person holding or carrying the receiver in his pocket. In a typical embodiment, the dimensions of the pocket-size casing are about 1 x 2¼ x 3½ inches and the overall receiver weight is about 7 ounces. A motor speed of 1800 r.p.m. with a weight of one gram and a radius of rotation of ¼ inch, with the axis of rotation extending in the direction of the longitudinal axis of the casing, produces an unbalanced force of the same order of magnitude as the weight of the receiver and the vibrations are readily sensible to the person. It will be appreciated that the force tending to vibrate the receiver is produced by continuous acceleration of the mass, which in the case of the rotary motor results from changing the direction, rather than magnitude, of the velocity vector of the mass.

Figure 4:
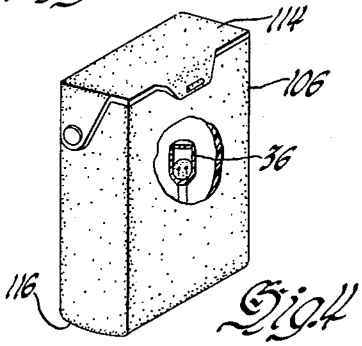
FIGURE 4 is one perspective view with part of the casing removed.
Figure 5:
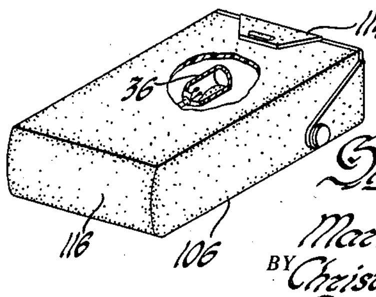
FIGURE 5 is another perspective view with part of the casing removed.

The switch 36 for controlling the energization of the receiver circuits, which was previously described as being an attitude responsive switch, suitably takes the form of a conventional mercury switch which is rigidly mounted on the chassis 104. The casing 106, suitably of molded plastic, is provided with a hinged cover 114 at the top and is formed with an arcuate end surface 116 at the bottom. The mercury switch 36 is oriented on the chassis 104 with its axis parallel to the longitudinal axis of the casing and with the spaced contacts toward the bottom of the casing. It will be apparent that the casing configuration is such that a person would naturally tend to insert the receiver in a pocket of his wearing apparel with its bottom end first which results in an attitude of the receiver such that the longitudinal axis of the casing is within a few degrees of the vertical and thus the mercury switch 36 is closed as shown in FIGURE 4. When the receiver is removed from the pocket and placed upon a table or the like, the arcuate end surface 116 of the casing provides an unstable support and the receiver must be laid on one of the remaining faces of the casing, as shown in FIGURE 5, which results in opening of the mercury switch 36 and deenergizing the receiver circuits to prevent unnecessary drain on the battery.

In operation of the inventive receiver, the receiver circuits will be energized when it is supported in an upright attitude such as by insertion in the pocket of wearing apparel. It may be assumed that the call signal assigned to the particular receiver is formed by the successive modulation of a 60 kilocycle carrier wave by a first tone frequency of 190 cycles for a duration of about three seconds followed by a second tone frequency of 250 cycles. This call signal is established for the particular receiver by the reed relay 22 in which the first reed contact 78 is mechanically resonant at 190 cycles and the second reed contact 90 is mechanically resonant at 250 cycles. Upon the receipt of a carrier wave encoded with any call signal it is amplified by the radio frequency amplifiers 14 and 16 and demodulated by the detector 18. The demodulation signal voltage is amplified by the tone amplifier 20 and the current corresponding thereto energizes the reed relay coil 70. If the first tone frequency of the encoded call signal is different from the assigned call signal, the energization of the reed relay 22 is ineffective to cause vibration of the first reed contact 78; if it corresponds to the second tone frequency of the assigned call signal, the second reed contact 90 will vibrate but will have no effect on the circuit. If, however, the first tone frequency of the encoded call signal corresponds to that of the assigned call signal, the energization of the coil 70 will cause the first reed contact 78 to vibrate and repetitively close the charging circuit for the storage condensers 80 and 80′ through the battery 10 and switch 36. The storage condensers will accumulate a charge which is retained after the first tone frequency ceases. If the second tone frequency of the encoded call signal is different from that of the assigned call signal, the coil 70 will be ineffective to vibrate the reed contact 90 and the charge of storage condensers 80 and 80′ will leak off through the resistor 88 in a time interval somewhat greater than that between successive call signals. If, however, the second tone frequency of the encoded call signal corresponds to the assigned call signal, the coil 70 will cause reed contact 90 to vibrate and repetitively complete the charge transfer circuit connecting condensers 80 and 80′ across the condenser 92 in the input circuit of switching network 24. The transferred charge causes a voltage to be applied in the forward direction between the emitter and base electrodes of transistor 96 and the output circuit from emitter to collector electrodes becomes conductive and develops a control voltage across resistor 102. This control voltage causes base to emitter current in the transistor 98 whereby the output circuit from collector to emitter electrodes is switched to a fully conductive condition and the motor 26 is energized. Accordingly, the weight 112 is rotated to produce vibrations of the receiver and to apprise the person that he is being paged. The vibrations continue to be produced by the motor 26 until the charge on condenser 92 diminishes sufficiently that the transistor 96 is cut off.

Although the description of this invention has been given with respect to a particular embodiment, it is not to be construed in a limiting sense. Numerous modifications and variations within the spirit and scope of the invention will now occur to those skilled in the art. For a definition of the invention, reference is made to the appended claims.

We claim:

1. A personal paging receiver comprising a pocket-size casing, sensing means disposed within the casing and being responsive to space transmitted energy of predetermined frequency for developing a signal voltage, signaling means within the casing including a rotary motor having a rotor assembly with an eccentric mass center and having an unobstructed path of motion, a voltage source, control means within the casing connected with the sensing means and the voltage source and being responsive to the signal voltage for causig energization of said motor, the centrifugal force produced by rotation of said eccentric mass center being so related to the weight of the receiver to produce readily sensible vibrations of the receiver at a frequency corresponding to the rotative speed of said motor to signal the person that he is being paged.

2. A pocket-size paging receiver adapted to selectively respond to the reception of a radio frequency carrier wave modulated successively by first and second tone frequencies, said receiver comprising a radio frequency amplifier tuned to the carrier wave frequency, a detector coupled with said amplifier and adapted to demodulate said carrier wave and produce successive signal voltages at the tone frequencies, a reed relay having its energizing coil coupled with the detector and having a pair of reed contacts mechanically resonant to predetermined different tone frequencies, a voltage source and a storage condenser serially connected with the first of said reed contacts whereby the condenser is charged upon the occurrence of a first predetermined tone frequency, a switching network including a transistor amplifier having its input circuit connected across said storage condenser through the second of said reed contacts whereby the transistor amplifier becomes conductive upon the occurrence of a second predetermined tone, said transistor amplifier having a resistor in its output circuit, a transistor having its input circuit connected across said resistor, a motor having its energizing windings connected serially with the said voltage source in the output circuit of the last mentioned transistor for energization upon the occurrence of said second predetermined tone frequency, said motor having a rotor assembly with an eccentric mass center to produce a centrifugal force upon rotation thereof to cause sensible vibration of the receiver.

3. A pocket-size paging receiver adapted to selectively respond to the reception of a radio frequency carrier wave modulated successively by first and second tone frequencies, said receiver comprising a radio frequency amplifier tuned to the carrier wave frequency, a detector coupled with said amplifier and adapted to demodulate said carrier wave and produce successive signal voltages at the tone frequencies, a reed relay having its energizing coil coupled with the detector and having a pair of reed contacts mechanically resonant to predetermined different tone frequencies, a voltage source and a first storage condenser serially connected with the first of said reed contacts whereby the condenser is charged upon the occurrence of a first predetermined frequency. a resistor connected across the first storage condenser to permit substantial discharge within a predetermined time interval, a transistor amplifier having a second storage condenser in its input circuit and connected across said first storage condenser through the second of said reed contacts whereby the transistor amplifier becomes conductive upon the occurrence of a second predetermined tone frequency within the said time interval, said transistor amplifier having a resistor in its output circuit, a transistor having its input circuit connected across said resistor, a motor having its energizing windings connected serially with the said voltage source in the output circuit of the last mentioned transistor for energization upon the occurrence of said second predetermined tone frequency, said motor having a rotor assembly with an eccentric mass center to produce a centrifugal force upon rotation thereof to cause sensible vibration of the receiver.

4. A pocket-size paging receiver adapted to selectively respond to the reception of a radio frequency carrier wave modulated successively by first and second tone frequencies, said receiver comprising a radio frequency amplifier tuned to the carrier wave frequency, a detector coupled with said amplifier and adapted to demodulate said carrier wave and produce successive signal voltages at the tone frequencies, a reed relay having its energizing coil coupled with the detector and having a pair of reed contacts mechanically resonant to predetermined different tone frequencies, a tuning condenser connected effectively across said energizing coil to form a parallel resonant circuit therewith tuned broadly to the tone frequencies, a voltage source and a storage condenser serially connected with the first of said reed contacts whereby the condenser is charged upon the occurrence of a first predetermined tone frequency, a switching network including a transistor amplifier having its input circuit connected across said storage condenser through the second of said reed contacts whereby the transistor amplifier becomes conductive upon the occurrence of a second predetermined tone, said transistor amplifier having a resistor in its output circuit, a transistor having its input circuit connected across said resistor, a motor having its energizing windings connected serially with the said voltage source in the output circuit of the last mentioned transistor for energization upon the occurrence of said second predetermined tone frequency, said motor having a rotor assembly with an eccentric mass center to produce a centrifugal force upon rotation thereof of the same order of magnitude as the weight of the receiver to cause sensible vibration thereof.

5. A personal paging receiver adapted to be carried on the person and to selectively respond to the reception of a radio frequency carrier wave modulated successively by first and second tone frequencies, said receiver comprising a casing enclosing a radio frequency amplifier tuned to the carrier wave frequency, a detector coupled with said amplifier and adapted to demodulate said carrier wave and produce successive signal voltages at the tone frequencies, a reed relay having its energizing coil coupled with the detector and having a pair of reed contacts mechanically resonant to predetermined different tone frequencies, a voltage source and a storage condenser serially connected with the first of said reed contacts whereby the condenser is charged upon the occurrence of a first predetermined tone frequency, an amplifier having its input circuit coupled with said storage condenser through the second of said reed contacts whereby the amplifier becomes conductive upon the occurrence of a second predetermined tone frequency, a motor having a stator mounted on said casing and having a rotor with an output shaft, said motor having energizing windings connected in the output circuit of the last mentioned amplifier, a weight eccentrically mounted on said shaft for rotation therewith through an unobstructed path of motion to impart vibrational motion to said casing, the centrifugal force produced by the rotation of said weight being of the same order of magnitude as the weight of the receiver whereby said casing is sensibly vibrated to signify to the person that he is being paged.

References Cited in the file of this patent

UNITED STATES PATENTS

| | | |
|---|---|---|
| 516,878 | Sacks | Mar. 20, 1894 |
| 868,621 | Zelenka | Oct. 15, 1907 |
| 2,260,689 | Miller | Apr. 18, 1939 |
| 2,494,541 | Olson | Jan. 31, 1946 |
| 2,512,621 | Emerson | June 27, 1950 |
| 2,591,937 | Herrick | Apr. 8, 1952 |
| 2,772,410 | Logue et al. | Nov. 27, 1956 |
| 2,827,621 | Reichert et al. | Mar. 18, 1958 |
| 2,883,523 | Meserow | Apr. 21, 1959 |
| 2,891,156 | Crow | June 16, 1959 |